United States Patent
Chuang et al.

(10) Patent No.: US 6,569,973 B2
(45) Date of Patent: *May 27, 2003

(54) PROCESS FOR MAKING VINYL CAPROLACTAM-BASED POLYMERS

(75) Inventors: Jui-Chang Chuang, Wayne, NJ (US); Jenn S. Shih, Paramus, NJ (US); Michael A. Drzewinski, Long Valley, NJ (US)

(73) Assignee: ISP Investments Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/900,346

(22) Filed: Jul. 6, 2001

(65) Prior Publication Data

US 2003/0008993 A1 Jan. 9, 2003

(51) Int. Cl.$^7$ .................................................. C08J 26/10
(52) U.S. Cl. ........................ 526/264; 526/258; 526/263; 526/271; 526/303.1; 526/318.3; 526/320; 526/328.5; 526/332

(58) Field of Search .................................. 526/264, 258, 526/263, 271, 303.1, 318.3, 320, 328, 332

(56) References Cited

U.S. PATENT DOCUMENTS

| | | | |
|---|---|---|---|
| 5,874,660 A | * | 2/1999 | Colle et al. .................... 137/13 |
| 6,225,429 B1 | * | 5/2001 | Chuang et al. ............. 526/258 |
| 6,242,518 B1 | * | 6/2001 | Bakeev et al. ................ 137/13 |

* cited by examiner

*Primary Examiner*—Tatyana Zalukaeva
(74) *Attorney, Agent, or Firm*—Walter Katz; William J. Davis; Marilyn J. Maue

(57) ABSTRACT

A process of making a vinyl caprolactam (VCL)-based polymer which comprises suspension polymerizing the monomers in aqueous medium in the absence of an added protective colloid, wherein polymer formed at an early stage of the polymerization functions as a dispersing agent to maintain polymer particles suspended in water throughout the polymerization.

9 Claims, No Drawings

PROCESS FOR MAKING VINYL CAPROLACTAM-BASED POLYMERS

CROSS-REFERENCE TO RELATED PATENT APPLICATION

This application is related to U.S. Ser. No. 09/346,213, filed Jul. 1, 1999, now U.S. Pat. No. 6,225,429, issued May 1, 2001.

BACKGROUND OF THE INVENTION

1. Field of the Invention

This invention relates to processes for making vinyl caprolactam (VCL)-based polymers, and, more particularly, to a suspension polymerization process for making such polymers in water without requiring the addition of protective colloids, and which are obtained thereby as substantially odor-free polymers, without residual monomers, and in an environmentally friendly solvent.

2. Description of the Prior Art

J. Kroker et al, in U.S. Pat. No. 5,739,195, described a process for preparing an aqueous solution of 10–60% polyvinyl caprolactam (PVCL) homopolymer at a temperature above its cloud point in the presence of 0.1–20% by weight based upon vinyl caprolactam (VCL) monomer of a water-soluble synthetic polymeric protective colloid. Aqueous polyvinyl caprolactam homopolymer made with a protective colloid present in the starting materials was homogeneous, whereas protective colloid free systems were inhomogeneous, which were not readily dilutable with water except stirring for a prolonged period of time. Addition of an emulsifier to the starting material also formed an appreciable portion of PVCL polymer remained attached to the stirrer element.

Accordingly, it is an object of this invention to provide a process for making VCL-based polymers in water without requiring addition of a water-soluble synthetic protective colloid in the reaction mixture.

Another object herein is to provide a process of making VCL-based copolymers and terpolymers by suspension polymerization in which the monomers are fed into the reaction vessel at a predetermined feeding schedule.

Still another object herein is to provide an aqueous solution of VCL-based polymers which are substantially odor-free, monomer-free and uncontaminated by the presence therein of protective colloids.

A feature of the invention is the provision of an aqueous suspension polymerization process for making VCL-based copolymers or terpolymers wherein a suitable dispersing agent for the copolymer product is generated in-situ during the polymerization.

These and other objects and features of the invention will be made apparent from the following description thereof.

SUMMARY OF THE INVENTION

What is described herein is an aqueous suspension polymerization process for making VCL-based polymers without an added protective colloid, in which the monomers are introduced into the reaction vessel at a predetermined feeding schedule, and wherein the dispersing agent to keep the copolymer product in a stirrable state during the polymerization is generated in situ during the course of the polymerization. In this invention, accordingly, the polymerization process proceeds smoothly to form a uniform suspension of fine polymer particles in water at a temperature above the cloud point of the polymer without developing large lumps of polymer material during polymerization.

The product of this process is an odor-free, monomer-free, aqueous solution of the desired VCL-based polymer uncontaminated by a protective colloid.

The process is adaptable to any VCL-based polymers, which are made by copolymerizing VCL monomer with one or more substantially water-soluble monomers. Examples of representative copolymers, are copolymers of VCL and vinyl pyrrolidone (VP); copolymers of VCL and N-vinyl-N-methylacetamide (VIMA); terpolymers of VCL/VP/$M_3$, where $M_3$ is a linear, acylic N-vinylamide monomer which is N-vinyl formamide, N-vinyl acetamide or N-vinyl-N-methylacetamide (VIMA), in predetermined proportions of each monomers, preferably at least 40% by wt. VCL, most preferably at least 50% by wt., the rest being VP and/or a linear, acylic N-vinylamide; and mixtures thereof.

The product can be used to provide completely alcohol-free, hair care compositions, e.g., 0% VOC hair fixatives and hair conditioners, gas hydrate inhibitors and ink-jet printing media.

DETAILED DESCRIPTION OF THE INVENTION

The polymerization process of the invention is carried out at a temperature of at least 15° C., preferably 35° C., above the cloud point of the polymer, as a suspension polymerization. In this protective colloid-free system, the monomers are fed into the reaction vessel at a predetermined feeding schedule to generate a polymer product in-situ at an early stage of the reaction as the dispersing agent to maintain the copolymer particles suspended in water during the polymerization. Accordingly, no added protective colloid is necessary in this process. The polymer product thus is a fine dispersion of polymer particles in water before cooling, without any polymer build-up on the agitator shaft and/or reactor wall, which causes agitation problems and a prolonged period of time to re-dissolve the polymer in water.

In a typical run, about 2–25%, preferably 3–15%, of the total amount of VP, or a substantially water-soluble monomer ($M_3$) or VP/$M_3$, with initiator is fed into water at the reaction temperature over 30 minutes, followed by metering in the remaining monomer pre-mix with initiator over 1–4 hours. Alternatively, the initiator can be fed separately into the reaction vessel. After holding the reaction mixture for one hour, 2–4 additional booster shots of initiators are added to react out any residual monomer to the desired low level. At the end of the reaction, the batch is cooled to ambient conditions to form a clear, viscous polymer solution.

As described, the VCL-based copolymers of the present invention, copolymers are made by copolymerizing VCL monomer with one or more substantially water-soluble monomers in predetermined proportions of each monomer. Examples of representative water-soluble comonomers, but not limited to, are vinyl amides such as vinylpyrrolidone, N-vinylformamide, N-vinylacetamide and N-vinyl-N-methylacetamide.

Usually the polymerization processes in water is performed at a temperature between 50° to 100° C. under nitrogen atmosphere, although polymerization can also be carried out at a temperature above 100° C. under pressure, or at a temperature below 50° C. using redox initiators. Suitable polymerization initiators typically have a half-life of 1–5 hours at a given polymerization temperature. Representative polymerization initiators include azo compounds such as 2,2'-azobis(2,4-dimethylvaleronitrile) (VAZO-52), 2,2'-azobis(isobutyronitrile) (VAZO-64), 2,2'-azobis(methylbutyronitrile) (VAZO-67) and 1,1'-azobis(cyanocyclohexane) (VAZO-88, du Pont); peroxyesters such as t-butyl peroxypivalate (Lupersol 11M75), t-amyl peroxypivalate (Lupersol 554M75) and t-amyl peroxy-2-ethylhexanote (Lupersol 575, Elf Atochem); peroxydicarbonates such as di-(2-ethylhexyl) peroxydicarbonate (Lupersol 223, Elf Atochem) and di-(4-t-butylcyclohexyl) peroxydicarbonate (Perkadox 16S, Akzo Nobel). During the residual monomer reduction period, a second polymerization initiator, if needed, can be used to speed up the polymerization cycle. The residual monomers can be eliminated by treatment with hydrogen peroxide thereby to minimize odor in the product.

The process of the invention enables the synthesis of VCL-based polymers directly in water. Water is an environmentally friendly solvent and is preferred in many end uses, for example, hair care formulations such as hairsprays, mousses, styling gel, etc., gas hydrate inhibition, ink jet printing, and the like.

The term polymer, copolymer or terpolymer, as used herein, refers to VCL-based polymers with one or more monomers, and allows for copolymers, terpolymers, tetrapolymers, etc. as desired. Suitably such VCL-based polymers should contain at least about 40% VCL, and preferably 50% or more, by weight, in the composition.

The invention will now be described in more detail with reference to the following examples.

EXAMPLE 1

Preparation of Vinyl Caprolactam (VCL)/Vinylpyrrolidone (VP)/N-Vinyl-N-Methylacetamide (VIMA) (75/5/20) Terpolymer in Water without Protective Colloid 300 g of distilled water was charged into a 1-I resin kettle, fitted with a nitrogen inlet tube, an anchor agitator, a thermal watch/thermocouple probe and a heating mantle. Nitrogen sparging was started and continued throughout the run. The kettle was then heated to 80° C. and maintained 80° C. with an agitation speed at 200 rpm. A pre-charge mixture of 5 g of VP, 5 g of VIMA and 0.20 g of Lupersol 11, was charged into the resin kettle over a period of 30 minutes. Thereafter, a mixture of 75 g of VCL, 15 g of VIMA and 0.80 g of Lupersol 11M75 initiator was pumped into the resin kettle over the next 60 minutes. After completion of monomer feeding, the reaction mixture was held at 80° C. for 60 minutes. Residual monomers were reduced by treatment with 0.50 g of Lupersol 11M75 initiator every 90 minutes for three times. The copolymer product was a milky-white dispersion in water at 80° C. Upon cooling, the reaction product was a clear viscous solution at room temperature.

EXAMPLE 2

Preparation of Vinyl Caprolactam (VCL)/Vinylpyrrolidone (VP)/n-Vinyl-N-Methylacetamide (VIMA) (71/24/5) Copolymer in Water without Protective Colloid This example illustrates the preparation of a vinyl caprolactam-based hair fixative polymer, namely VCL/VP/VIMA (71/24/5) copolymer, directly in water according to a predetermined monomer feeding sequence, and without adding a protective colloid. It further describes the use of hydrogen peroxide as the chase initiator, which generates water as the sole by-product, to minimize offensive odor due to the use of excessive amounts of organic initiator.

300.00 g of distilled water was charged into a 1-I resin kettle, fitted with a nitrogen inlet tube, an anchor agitator, a thermal watch/thermocouple probe and a heating mantle. After pH adjustment to 10 with 2 drops of concentrated ammonium hydroxide, nitrogen sparging was started and continued throughout the run. The kettle was then heated to 80° C. and maintained 80° C. with an agitation speed at 250 rpm. A pre-charge mixture of 4.80 g of distilled VP, 1.00 g of VIMA and 0.20 g of Lupersol 11M75 initiator (t-butyl peroxypivalate, 75% active), corresponding to 5.8% of total monomers, was pumped it into the resin kettle over a period of 30 minutes. Thereafter, a mixture of 71.00 g of VCL (V-CAP/RC®, ISP), 19.20 g of VP, 4.00 g of VIMA and 0.80 g of Lupersol 11M75 initiator was pumped into the resin kettle over the next 60 minutes. The reaction mixture turned milky within 5 minutes upon the charging of the monomer pre-mix. After completion of monomer feeding, the reaction mixture was held at 80° C. for 60 minutes. Residual monomers were reduced by treatment with 2.00 g of hydrogen peroxide(30% active) every 90 minutes for three times. The copolymer product was a milky-white dispersion in water at 80° C. Upon cooling, the reaction product gained in viscosity at about 50° C. and became a clear, viscous solution at room temperature. The solids content was adjusted to 25% in water. Gas chromatography (GC) analysis indicated that it contained only 0.0080% VCL, 0.0021% VP and $\leq$0.010% VIMA. The polymer had a cloud point of 45° C. (0.5% in water) and a relative viscosity of 1.765 (1% in water).

EXAMPLE 3

Preparation of Vinyl Caprolactam (VCL)/N-Vinyl-N-Methylacetamide (VIMA) (75/25) Copolymer in Water 300 g of distilled water was charged into a 1-I resin kettle, fitted with a nitrogen inlet tube, an anchor agitator, a thermal watch/thermocouple probe and a heating mantle. Nitrogen sparging was started and continued throughout the run. The kettle was then heated to 80° C. and maintained 80° C. with an agitation speed at 200 rpm. A pre-charge mixture of 10 g of VIMA and 0.20 g of Lupersol 11, was charged into the resin kettle over a period of 30 minutes. Thereafter, a mixture of 75 g of VCL, 15 g of VIMA and 0.80 g of Lupersol 11M75 initiator was pumped into the resin kettle over the next 60 minutes. After completion of monomer feeding, the reaction mixture was held at 80° C. for 60 minutes. Residual monomers were reduced by treatment with 0.50 g of Lupersol 11M75 initiator every 90 minutes for three times. The copolymer product was a milky-white dispersion in water at 80° C. Upon cooling, the reaction product was a clear viscous solution at room temperature.

EXAMPLE 4

Preparation of Vinyl Caprolactam (VCL)/N-Vinyl-N-Methylacetamide (VIMA) (60/40) Copolymer in Water 300 g of distilled water was charged into a 1-I resin kettle, fitted with a nitrogen inlet tube, an anchor agitator, a thermal watch/thermocouple probe and a heating mantle. Nitrogen sparging was started and continued throughout the run. The kettle was then heated to 80° C. and maintained 80° C. with an agitation speed at 200 rpm. A pre-charge mixture of 10 g of VIMA and 0.20 g of Lupersol 11, was charged into the resin kettle over a period of 30 minutes. Thereafter, a mixture of 60 g of VCL, 30 g of VIMA and 0.80 g of Lupersol 11M75 initiator was pumped into the resin kettle over the next 60 minutes. After completion of monomer feeding, the reaction mixture was held at 80° C. for 60 minutes. Residual monomers were reduced by treatment with 0.50 g of Lupersol 11M75 initiator every 90 minutes for three times. The copolymer product was a milky-white dispersion in water at 80° C. Upon cooling, the reaction product was a clear viscous solution at room temperature.

EXAMPLE 5

Preparation of Vinyl Caprolactam (VCL)/N-Vinyl-N-Methylacetamide (VIMA) (75/25) Copolymer in Water 300 g of distilled water was charged into a 1-l resin kettle, fitted with a nitrogen inlet tube, an anchor agitator, a thermal watch/thermocouple probe and a heating mantle. Nitrogen sparging was started and continued throughout the run. The kettle was then heated to 80° C. and maintained 80° C. with an agitation speed at 200 rpm. A pre-charge mixture of 2.5 g of VCL and 7.5 g of VIMA and 0.20 g of Lupersol 11, was charged into the resin kettle over a period of 30 minutes. Thereafter, a mixture of 72.5 g of VCL, 17.5 g of VIMA and 0.80 g of Lupersol 11M75 initiator was pumped into the resin kettle over the next 60 minutes. After completion of monomer feeding, the reaction mixture was held at 80° C. for 60 minutes. Residual monomers were reduced by treatment with 0.50 g of Lupersol 11M75 initiator every 90 minutes for three times. The copolymer product was a milky-white dispersion in water at 80° C. Upon cooling, the reaction product was a clear viscous solution at room temperature.

While the invention has been described with particular reference to certain embodiments thereof, it will be understood that changes and modifications may be made which are within the skill of the art. Accordingly, it is intended to be bound only by the following claims.

What is claimed is:

1. A process of making a vinyl caprolactam (VCL)-based polymer by suspension polymerization of the monomers in water in the absence of an added protective colloid, said polymer contains at least 40% by wt. VCL, and the rest is vinyl pyrrolidone (VP) monomer and/or an $M_3$ monomer where $M_3$ is a linear, acylic N-vinylamide monomer, selected from the group consisting of N-vinyl formamide (NVF), N-vinylacetamide (NVA) and N-vinyl-N-methylacetamide (VIMA), at a polymerization temperature which is at least 15° C. higher than the cloud point of said polymer, by the steps of: (a) feeding over time a monomer pre-mix comprising VP and/or $M_3$, and initiator, into a reaction vessel containing water as solvent heated to said polymerization temperature, thereby to generate in-situ copolymer which can function as a dispersing agent for said polymer during the polymerization, (b) thereafter feeding the VCL monomer, and the rest of the VP and/or $M_3$ monomer, and initiator, into said vessel over a predetermined period, and (c) polymerizing said monomers with said dispersing copolymer therein to provide, upon cooling to room temperature, a clear, viscous aqueous polymer solution.

2. A process according to claim 1 where $M_3$ is present.

3. A process according to claim 1 wherein the monomers are VCL and VIMA.

4. A process according to claim 1 wherein VP monomer is present.

5. A process according to claim 1 wherein the monomers are VCL and NVA.

6. A process according to claim 1 wherein the monomers are VCL, VP and VIMA.

7. A suspension polymerization process according to claim 1 wherein the first monomer feed comprises a premix of VP and/or $M_3$ which corresponds to about 2 to 25% the weight of the total monomers in the polymer composition.

8. A process according to claim 1 which is carried out at a polymerization temperature which is at least 35° C. higher than the cloud point of the polymer.

9. A process according to claim 1 which polymer contains at least 50% by wt. VCL.

* * * * *